United States Patent [19]

Carpentier et al.

[11] Patent Number: 5,126,939
[45] Date of Patent: Jun. 30, 1992

[54] METHOD FOR ESTIMATING THE ORGANIC MATTER CONTENT OF SEDIMENTARY ROCKS FROM DATA RECORDED IN WELLS BY WELL-LOGGING PROBES

[75] Inventors: Bernard Carpentier, Labbeville; Alain-Yves Huc, Rueil-Malmaison, both of France

[73] Assignee: Institut Francais du Petrole, Rueil-Malmaison, France

[21] Appl. No.: 344,399

[22] Filed: Apr. 28, 1989

[30] Foreign Application Priority Data

Apr. 28, 1988 [FR] France .................. 88 05846

[51] Int. Cl.⁵ .................. G01V 1/00; G06F 15/48; G06F 15/50
[52] U.S. Cl. .................. 364/422; 324/339
[58] Field of Search .................. 364/422; 324/339

[56] References Cited

U.S. PATENT DOCUMENTS

| | | | |
|---|---|---|---|
| 4,369,497 | 1/1983 | Poupon et al. | 364/422 |
| 4,495,604 | 1/1985 | Dumanoir | 364/422 |
| 4,502,121 | 2/1985 | Clavier et al. | 364/422 |
| 4,531,188 | 7/1985 | Poupon et al. | 364/422 |
| 4,742,459 | 5/1989 | Lasseter | 364/422 |
| 4,916,616 | 4/1990 | Freedman et al. | 364/422 |

Primary Examiner—Dale M. Shaw
Assistant Examiner—Laura Brutman
Attorney, Agent, or Firm—Antonelli, Terry, Stout & Kraus

[57] ABSTRACT

The invention provides a method for determining the organic matter content of sedimentary rocks from data recorded in the well by at least two well-logging probes measuring different parameters. Two probes are chosen, one for responding in the same direction ot a variation of the water and organic matter content of the rocks, the other for responding very differently to a variation of one or other of these same components, and both so that the iso-organic matter content lines in a three pole diagram are substantially merged whether the third pole is the water pole or the clay pole. The position of the line I(0%) is determined experimentally and the organic matter content is derived therefrom corresponding to each pair of values of the parameters measured in the well. In a diagram where the parameters used depend, for example, on the transit time of sound in the rock and on the electric resistivity of the formations, the iso-content lines form a family of parallel lines.

9 Claims, 6 Drawing Sheets

METHOD FOR ESTIMATING THE ORGANIC MATTER CONTENT OF SEDIMENTARY ROCKS FROM DATA RECORDED IN WELLS BY WELL-LOGGING PROBES

BACKGROUND OF THE INVENTION

1. Field of the Invention

The invention relates to a new method for estimating the organic matter content of sedimentary rocks and principally host-rocks from data recorded in wells or bore-holes by well-logging probes.

The method of the invention concerns more particularly the determination of the organic matter content of host-rocks by using data obtained from at least two logs of different kinds, such for example as a sound log and a resistivity log. In the first case, it will be recalled, a probe is lowered into a bore-hole having sound wave transmitting and receiving transducers and the propagation speed of these waves in the formations crossed by the bore-hole and in the vicinity thereof is measured. In the second case, it is the electric resistivity of the ground surrounding the well which is measured.

Estimation of the organic matter content of host-rocks forms an important element in the oil-bearing estimation of a sedimentary basin.

2. Description of the Prior Art

The methods used for estimating the organic matter content of sedimentary rocks is derived from organic geochemistry. They consist essentially in quantifying and characterizing the organic matter contained in samples taken from well cuttings or else possibly from geological core samples, when they are available. The geochemical data obtained is generally scant and fragmented because of the lack of available samples. The organic matter content of geological formations is therefore very often only known in a restricted number of depths and the estimation thereof is related to the representativity of the cuttings taken from the wells. Each sample taken from the cuttings is often representative of a certain thickness of ground (of the order of several meters) and in formations with rapid facies variations it does not give a fine enough picture of their heterogeneity. Furthermore, some samples are not very significant to the extent that they were taken from zones which have been mixed with falls coming from upper layers. In addition, the presence of certain products such as gasoil or fuel oil, which may be in the drilling sludge, completely falsifies the measurements made in the laboratory.

It should also be noted that corrections must be made to the depths at which the samples are taken, measured by the drillers, so that the data resulting from the geochemical analyses may be usefully compared with those obtained by well-logging and this requires resetting of depths.

The estimation of the values of the organic matter content all along a well is therefore generally time-consuming and very delicate.

Research has already been undertaken to try to link the organic matter content to measurements made by well-logging probes of very different types. They have shown that the measurements were influenced by the different components of the rock and particularly by its organic matter content. But up to now little success has been obtained in defining the specific influence of the organic matter content on the well-logging measurements, with a sufficient accuracy to make a correct and representative estimation thereof possible.

The methods already used have an empiric character and are applicable only in particular cases.

SUMMARY OF THE INVENTION

The method of the invention makes it possible to improve the prior art results and to give, systematically, a representative estimation of the organic matter content of geological formations from data collected by well-logging probes.

It is characterized in that it comprises: the use of data provided by at least two well-logging probes measuring two different parameters, chosen so that:

a) one of the probes produces measurement signals evolving in the same direction in response to a variation of the water, clay and organic matter content in sedimentary rocks, b) the other probe produces measurement signals evolving in opposite directions to each other in response to a variation of the organic matter content, on the one hand, and the water or clay content, on the other, in the same sedimentary rocks, and c) the two probes are further chosen so that a part at least of the sets of pairs of values of the measured parameters corresponding to an equal organic matter content, associated respectively with sedimentary rocks comprising a given proportion of clay or water, are substantially identical (in a graphic representation, as will be seen, these sets of pairs may be represented by iso-content lines), the selection of at least one pair of values of the characteristic parameters of the pure organic matter, drawing up of a network of sets of pairs of values of the measured parameters, each of the sets of said network corresponding to an equal organic matter content, taking as reference a set of pairs of values corresponding to sedimentary rocks containing a given organic matter content, successive determination of the set of pairs of the network to which belongs each of the pairs of values of the two parameters measured by the probes chosen at a plurality of measuring points at different depths in the same well, and recording of the organic matter content values associated respectively with said sets of pairs, so as to provide a substantially continuous representation of the organic matter content of the formations crossed by the well.

For example, the measurements made by at least two well probes are used, adapted for measuring the electric resistivity of the ground crossed, the transit time of sound through the same ground, their hydrogen atom content or their density.

In a particular embodiment, measurements are used made by a well probe measuring the electric resistivity of the ground and at least one other well probe measuring for example the transit time of sound through this same ground, a representation diagram is chosen as a function of the resistivity and of the transit time where said network of sets of pairs of values of the parameters measured may be likened to a network of substantially parallel iso-content lines, the organic matter content associated with each pair of values of the resistivity and of the transit time measured in the well then being determined by identifying the iso-content line passing through the point representative of said pair in the chosen representation diagram.

Compared with prior art methods, the method of the invention has major advantages:

- it makes it possible to obtain systematically an estimation of the organic matter content of any formations from well-logging measurements carried out with even spacing all along a well or a well portion. The difficulties related, in prior art geochemical methods, to the discontinuous and fragmented character of the data collected and to its representativity are here avoided.
- it is applicable to an early stage of exploration, as early as the phase of recording the well logs and in all wells where recordings are available taken by two probes from the most generally used such as probes for measuring the resistivity, the transit time of sound, density etc.
- the richness of the information which it provides concerning the organic matter contents is much better than that obtained in the laboratory by analyzing a very restricted number of samples.
- estimation of the organic matter content such as shown by the recordings obtained by the method of the invention makes possible a selection of the lithologic levels which will then be the subject of finer geochemical studies.

The distribution of the organic matter along lithologic columns, obtained by the method of the invention, facilitates the work of geological interpretation. The lateral and vertical evolutions of the organic matter contents in the host-rocks may be better studied, the rules governing the sedimentology of the organic matter on the scale of the basin can be better defined and a quantitative oil-bearing estimation obtained which is the most reliable possible.

BRIEF DESCRIPTION OF THE DRAWINGS

Other characteristics and advantages of the invention will be clear from the following description of one embodiment given by way of non limitative example with reference to the accompanying drawings in which.

DESCRIPTION OF THE PREFERRED EMBODIMENT

Figure 1:
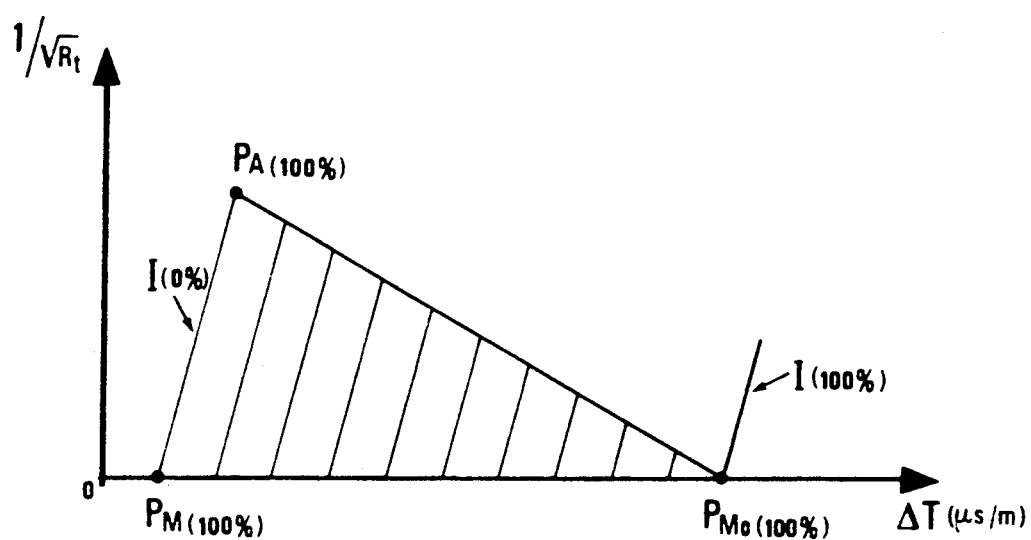
FIG. 1 shows a network of iso-organic matter content lines in a three pole diagram.

The method of the invention comprises the use of data recorded by well-logging tools which make it possible to isolate the effects proper to the organic matter and, thus, to estimate its percentage within sedimentary rocks.

It is considered that a rock is an assembly of different components: the organic matter (MO) including oil and gas, the clays in the sense of phyllo-silicates with their component water and that which they retain by porosity, the water not included in the clays and the assembly of minerals, clays excluded, which will be designated by matrix in the rest of the text.

The method of the invention comprises first of all the selection of two well-logging tools suitable for estimating the organic matter.

It is known that the response of well-logging tools is related to the characteristics proper to the components as well as their respective percentage in the volume of rocks studied. The tool measuring the transit time of sound through the formations is sensitive to the water, organic matter and clay contents and much less to the composition variations of the matrix. The tool measuring the density is sensitive to water and to the organic matter but not to clay. A neutron probe measuring the number of hydrogen atoms in the formations is sensitive to their water, organic matter or clay content. The tool for measuring the electric resistivity of the rock will make little difference between the clay and the water if it is conducting, and none for composition variations of the matrix if the conducting minerals are not in a continuous phase therein. It so happens that a gamma ray probe gives no response related directly to the physical parameters of the organic matter.

When it is desired to estimate the volumetric percentage of organic matter from data provided by a probe measuring the transit time $\Delta T$ or the density or else by a neutron probe, if we disregard the matrix and the clay, the effects produced by a variation of the porosity or more exactly of the water content and a variation of the organic matter content are equivalent because the physical characteristics of water and the organic matter are closely related. For these three probes, water and organic matter are practically indiscernible. None of the three, taken individually, allows their respective proportions to be calculated.

It is also known that the tool measuring the resistivity does not make the difference between resistivity variations related to variations in the organic matter and matrix proportions contained in the rocks for this parameter is very high for both of them.

In practice, two different well-logging probes are required for estimating the volumetric percentage of organic matter. Thus, a tool is chosen whose measurement signals evolve in opposite directions from each other in response to a variation of the organic matter content of the rocks, on the one hand, and the water and clay content, on the other, and another tool whose responses to a variation of the water, clay and organic matter content of the rocks varies in the same direction. In other words, the first tool is selected which, when displaced along the well, provides an increasing signal for an increase of organic matter content of the rocks and a decreasing signal for a decrease in the organic matter of the rocks, and provides a decreasing signal for an increase of water and clay content of the same rocks and an increasing signal for a decrease of water and clay content in the same rocks. The second tool is selected which provides, at any position of the well, an increasing signal for an increase of the organic content of the rocks and a decreasing signal for a decreasing organic content of the rocks, and provides an increasing signal for an increase of the water and clay content of the same rocks and a decreasing signal for a decrease of the water and clay content of the same rocks.

As first tool, a probe may for example be chosen measuring the resistivity of the ground crossed.

The other series of measurements required may be obtained for example by means of a tool measuring the transit time of sound $\Delta T$ through the rock or the density or else the hydrogen atom content which, all three, react in the same direction for water, clay and organic matter.

The two well-logging tools are chosen also so that a part at least of the sets of pairs of values of measured parameters (namely the resistivity on the one hand and the transit time $\Delta T$, the density or the hydrogen atom content on the other) which correspond to the same organic matter content for sedimentary rocks comprising a given proportion of clay or water are substantially identical.

This selection of tools makes it possible to considerably simplify the operation for estimating the organic matter content. In a diagram of variations depending on the two chosen parameters, the sets of pairs of values of the parameters already mentioned are distributed over iso-organic matter content curves. On the diagram, four pure poles may be positioned which correspond to the four pairs of values taken by the parameters if the host-rock contains 100% either of organic matter or of water, or of matrix or else of clay. If the responses of the well-logging probes vary as a function of the volumetric percentage of these four components, with any rock which contains any proportion thereof may be associated a point in space defined by curves joining the four poles. But if only two different measuring tools are available, a three pole representation system must be used so that the respective percentages of the different components may be estimated graphically or calculated.

This is possible, as has been established, by verifying experimentally that the iso-content curves which join the matrix pole to the water pole on the one hand and to the clay pole on the other are substantially merged over a part at least of their length and therefore that they are substantially at the same place, in the case of water and clay, in a very frequent geological context where the formation water is relatively salty and the porosity of the underground formations (excluding that of the clay) is low. The concordance of the iso-content lines can be observed particularly when the resistivity $R_t$, transit time $\Delta T$ diagram is used for situating the points representative of the organic matter contents.

It may be considered that the shale content of a rock varies linearly as a function of $\Delta T$ and also $1/\sqrt{R_t}$ and therefore that, in a system of coordinates ($\Delta T$, $1/\sqrt{R_t}$) the volumetric iso-organic matter content curves are lines (FIG. 1) parallel to those which connect the 100% matrix pole $P_M$ to the 100% clay point $P_A$. Since the resistivity of the matrix or of the organic matter may be considered as infinite, the matrix pole and the organic matter pole are situated on the same axis $\Delta T$ but at distinctly different positions, for the transit time $\Delta T$ of the matrix M (of the order of 140$\mu$s/meter to 190$\mu$s/meter depending on its composition) is very much less than that of the organic matter $\Delta T(MO)$. It is estimated that in most cases $\Delta T$ (MO) varies about a mean value of 800 $\mu$s/meter.

A similar diagram may be plotted by replacing the clay pole $P_A$ by a 100% water pole $P_E$. Similarly, the iso-organic matter straight lines are parallel to that which joins the 100% water pole to the matrix pole $P_M$.

It can be verified experimentally that, in such a diagram, the iso-organic matter straight lines have substantially the same slope whether the water pole $P_E$ or the clay pole $P_A$ (FIG. 2) is considered and so that the percentage of organic matter contained in a rock may be determined even if the exact position of the water pole or the clay pole is not known, as long as the straight line on which they are located can be determined.

Consequently, estimation of the organic matter content of the rock only requires positioning of the line I (0%) joining the matrix pole to the clay or water pole (and corresponding to a 0 content) and the selection of a value $\Delta T_{MO}$ on axis $\Delta T$ which corresponds to the transit time of sound in a rock which only contains organic matter. This value $\Delta T_{MO}$ may be chosen by geologists who consider it as being representative of the sedimentary basin where the studies are made or else may be calculated from the well-logging data obtained, as will be seen further on in connection with FIG. 6.

The set of pairs of values of the parameters serving as reference which is represented by the iso-content line corresponding to a rock containing a given organic matter percentage is obtained experimentally from values of the two parameters chosen measured along each well or well portion. In the diagram ($\Delta T$, $1/\sqrt{R_t}$) this reference line is either the straight line I (0%) (FIG. 2) extending from the matrix pole $P_M$ or a line I passing through at least one point (associated with a pair of measured values) to which a particular content may be attributed.

To determine this reference line in the first case, on the diagram are plotted the values of the two parameters chosen measured at a large number of positions along each well. In the diagram as a function of $\Delta T$ and $1/\sqrt{R_t}$, shown in FIG. 3, the reference line I (0%) is a straight line with larger slope extending from the matrix pole and passing among all the points representative of the pairs of values. The slope of this line is defined by a numerical value $\Delta T_A$ associated with one of its points, for which the value of $1/\sqrt{R_t}$ is equal to 0.6 for example.

This method of determining the reference line for 0% organic matter implies that, among the layers crossed by the well, some are devoid of organic matter. This is possible if it has been possible to verify experimentally the existence of such layers by comparison with geochemical analysis results.

Failing that, if a given organic matter content is attributed to at least one point plotted on the diagram (corresponding to a pair of values measured at a certain depth of the well), the straight line $I_f$ (FIG. 3) may be plotted as well as point B (FIG. 3) which corresponds to a rock containing only the matrix and this same organic matter content. This latter point B is situated on the axis $\Delta T$ but separate from the pole $P_M$ (100%). The network of sets of pairs of values is represented by the family of iso-content straight lines, from the straight line I (0%) to the straight line (100%), parallel to the straight line $I_f$.

Experiments in which it has been possible to compare the results obtained by the method of the invention with geochemical measurements made on cuttings have shown that the error committed in positioning the reference line due to the possible measurement errors in positioning the points, was negligible if the vertical distance travelled by the well-logging probes used was sufficiently large.

Figure 3:
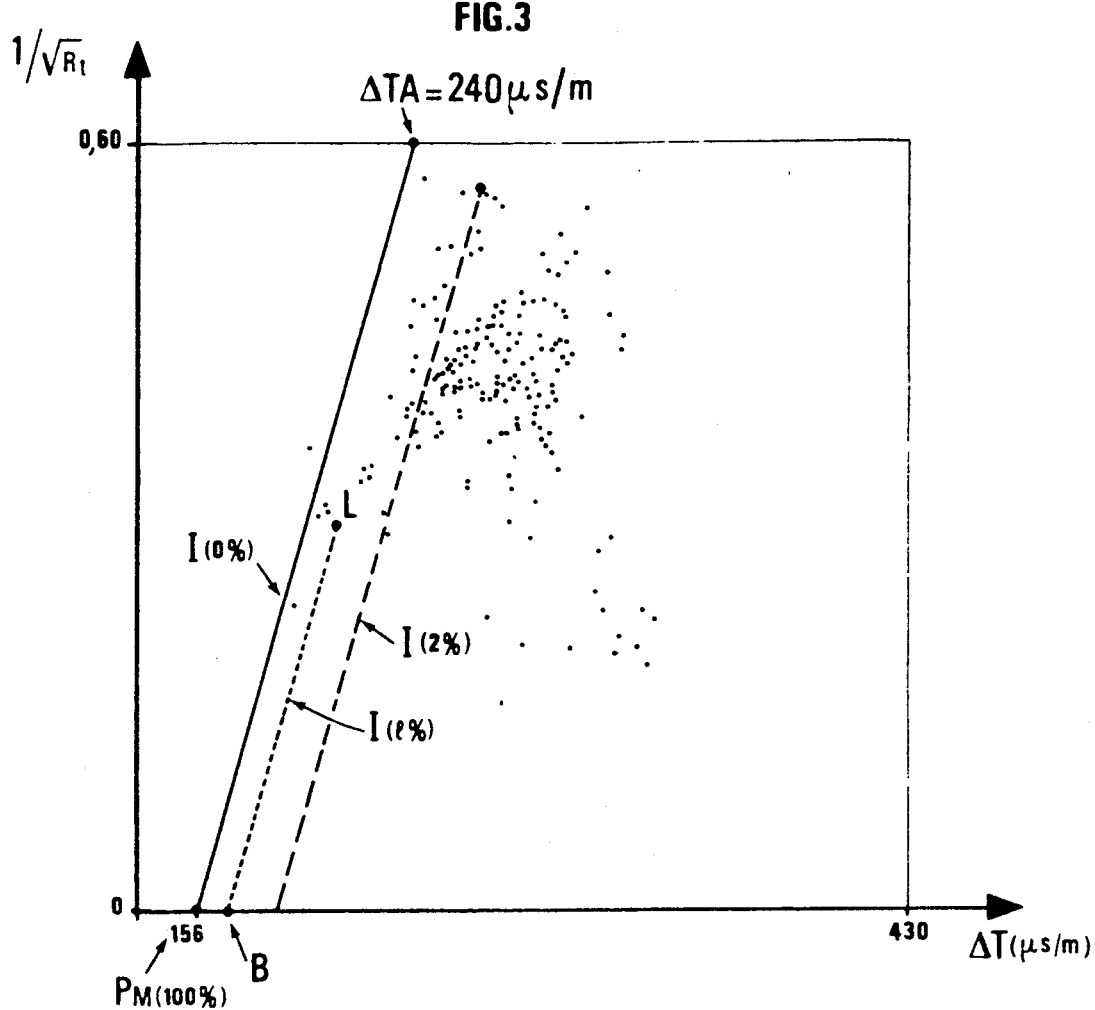
FIG. 3 shows the plotting on the same diagram of the set of pairs of values of the parameters measured in a well by two well-logging probes.

It can also be seen in the diagram of FIG. 3 that the volumetric iso-content line I(2%) corresponding to a percentage of 2% of organic matter by volume is clearly separate from the line I (0%), so that a possible error in the positioning of the latter remains compatible with the desired accuracy.

With the iso-content reference line I(0%) or I(1%) positioned on the diagram, the volumetric content may then be calculated which is associated with each of the points marked in FIG. 3.

Figure 4:
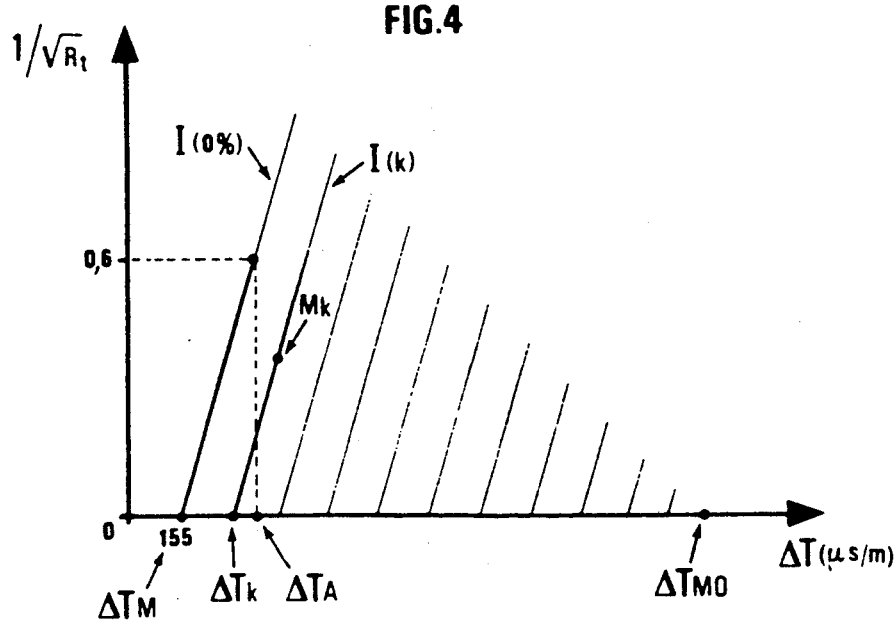
FIG. 4 shows, by way of example, a method of estimating the volumetric organic matter content of a rock as a function of the value of a pair of parameters measured in a well.

In the general case, the position of the different lines of a network of iso-content lines is determined from the reference line and the value chosen for the coefficient $\Delta T(MO)$. In the practical case of representation ($\Delta T$, $1/\sqrt{R}$) of FIGS. 3, 4 where the network is a set of straight lines parallel to the reference straight line I(0%), the straight line I(k) of the network is plotted passing through every point Mk defined by the well-logging measurements and the associated value $\Delta T_k$ is measured. The volumetric content which corresponds thereto is then obtained by applying the relation:

$$t(\%) = \frac{\Delta T_k - \Delta T_M}{\Delta T_{MO} - \Delta T_{TM}} \quad (1)$$

where $\Delta T_M$ and $\Delta T_{MO}$ are, it will be recalled, the transit times associated respectively with the matrix pole and with the organic matter pole.

With the calculation made for each of points ($M_k$) of the diagram, the values obtained may be recorded and a graphic representation provided of the variation of the volumetric content of the rocks as a function of the depth.

Preferably, the volumetric contents obtained t(%) are transformed into weighting organic carbon contents tp using the relation:

$$tp = t(\%) \cdot \frac{D_{MO}}{d} \cdot \frac{1}{k} \quad (2)$$

where $D_{MO}$ represents the density of organic matter, d the density of the rock and k a factor of proportionality between the organic carbon and the organic matter. By this transformation, comparisons with the results obtained by geochemical analyses are facilitated. The preceding results may be "smoothed" over a depth of several meters so as to obtain results representative of the same formation thickness as the geochemical analyses.

The value d used in the relation (2) may be either data obtained by means of a probe measuring the density, if such a log is available or else a value estimated from data known from elsewhere and particularly from density logs which may have been made in other wells.

Figure 5:
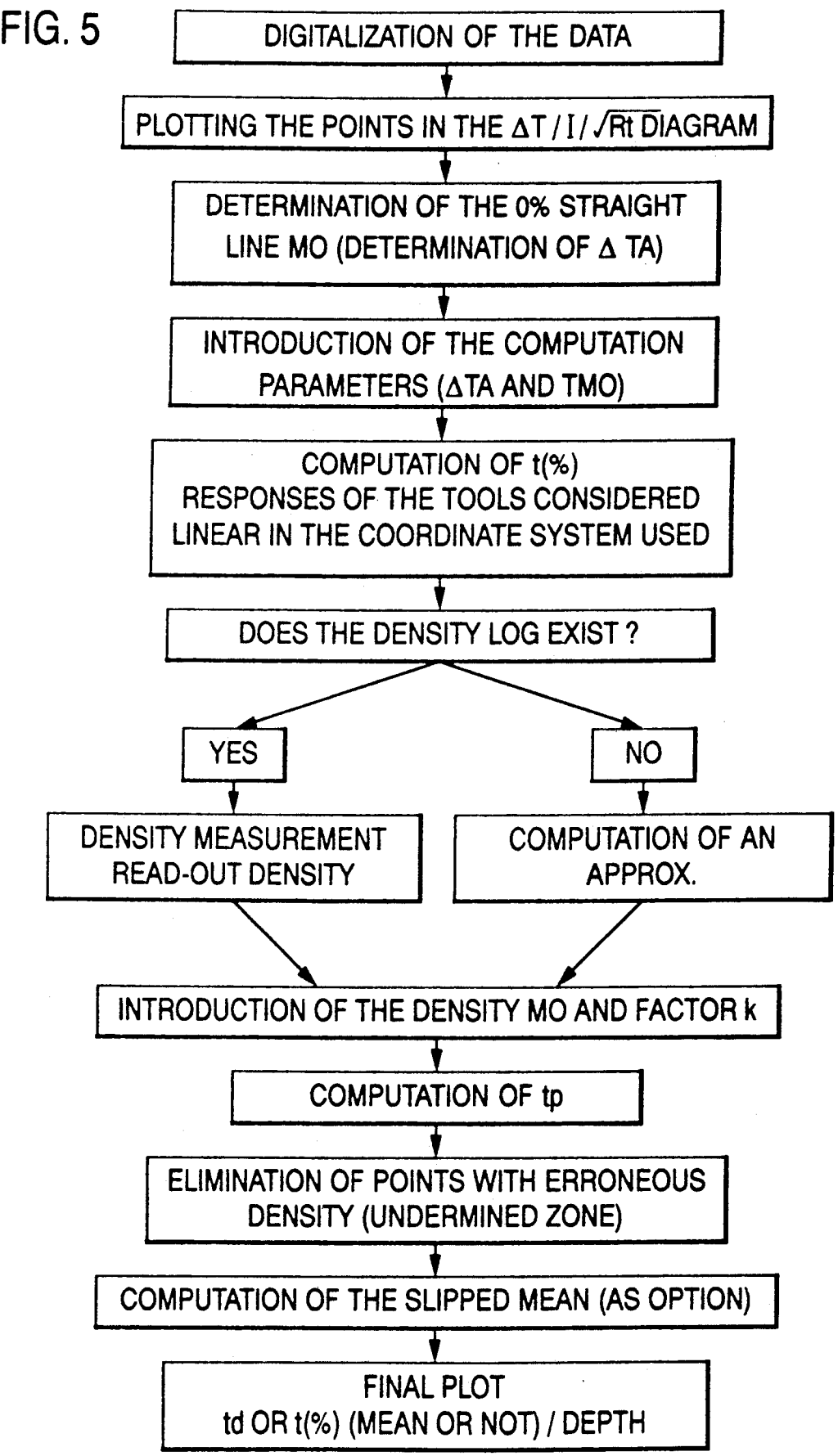
FIG. 5 shows a flowchart recapitulating the set of operations to be carried out on the recordings of the well log data so as to obtain a recording of the contents along a well.

The processing flowchart which is followed so as to obtain recording of the variations of the weighting content $t_d$ as a function of the depth is shown in FIG. 5.

Figure 2:
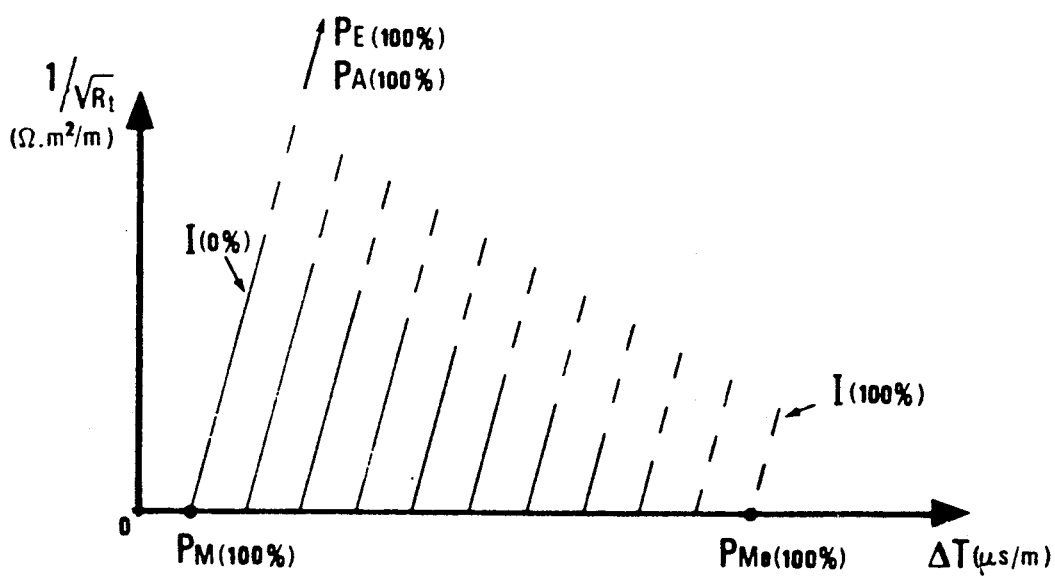
FIG. 2 shows, in the same diagram, a network of iso-organic matter content lines obtained without knowing the exact position of one of the poles but only the direction in which it is located.

In the case where, for each well studied, data is available, even partial, obtained by geochemical analysis of samples from the well, a comparison may if required be made between it and the well-logging data so as to obtain with greater accuracy the position of pole $P_{MO}$ along axis $\Delta T$ (FIGS. 1, 2).

Since the value $\Delta T_A$ associated with the reference line is known and since the possible variation range of $T_{MO}$ is defined, the value of this latter parameter may be varied by incrementing by value a until the absolute value of the difference between the mean of the values of the weighting organic matter content of the samples ($t_p$ sample) and the mean of the corresponding values obtained from the well-logging measurements ($t_p$ log) "smoothed" over a certain depth range (2 meters for example), is minimum.

Figure 6:
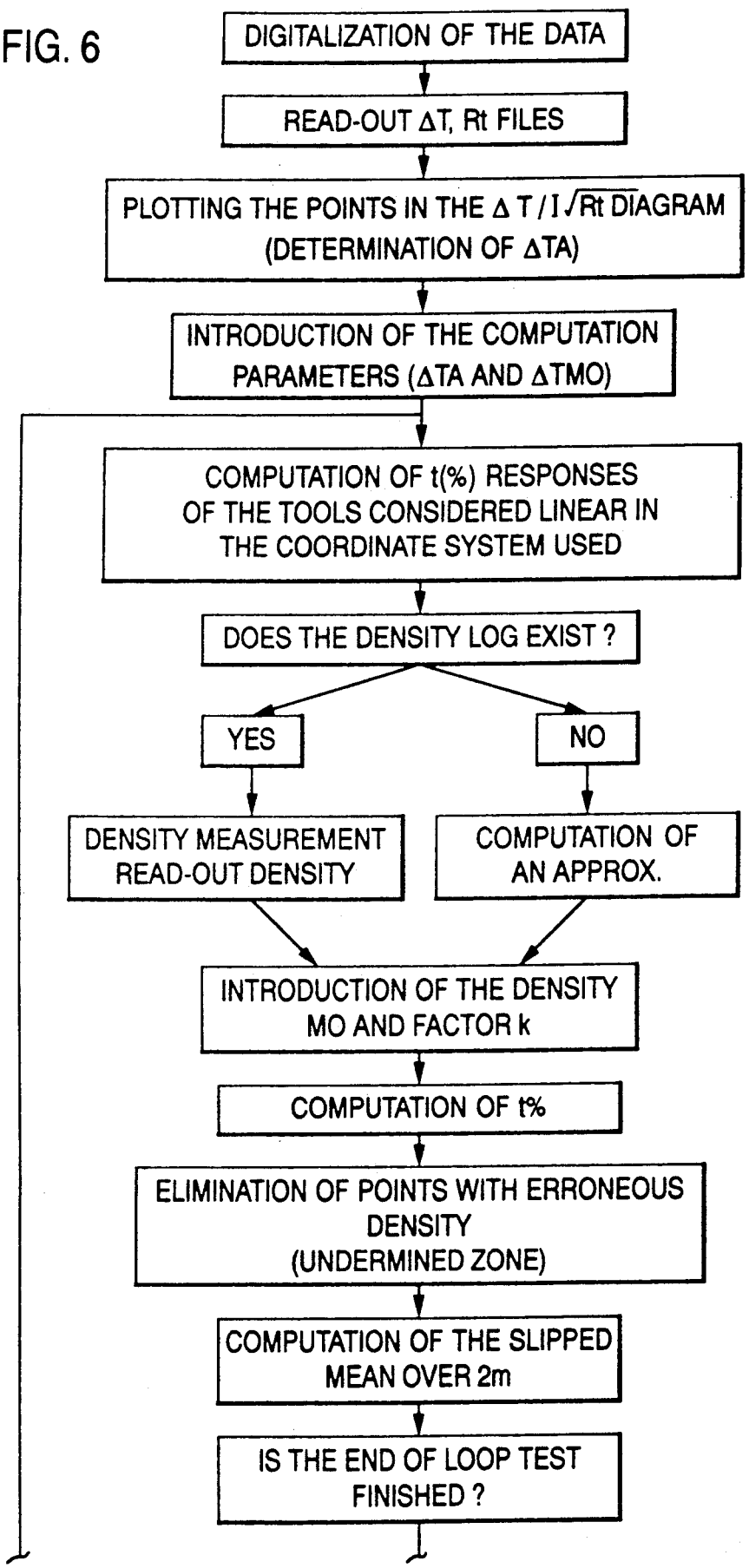
FIGS. 6 and 6A show the same split flowchart of the operations to be carried out so as to obtain an optimum value of one of the characteristic parameters of the pure organic matter.
Figure 6A:
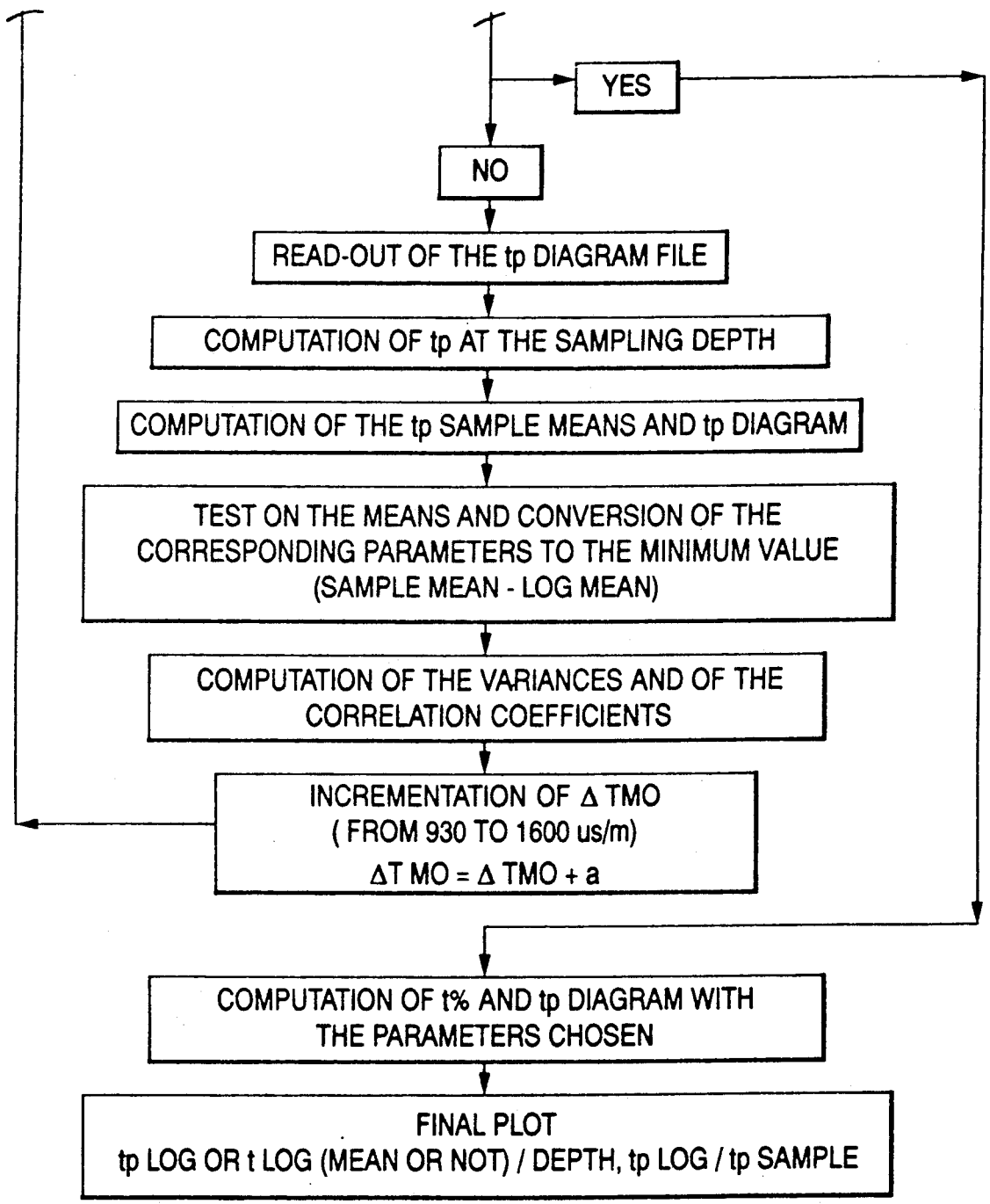

The processing flowchart which may be followed for obtaining the optimum values of $\Delta T_{MO}$ for the well studied is shown in two parts in FIGS. 6 and 6A.

Figure 7:
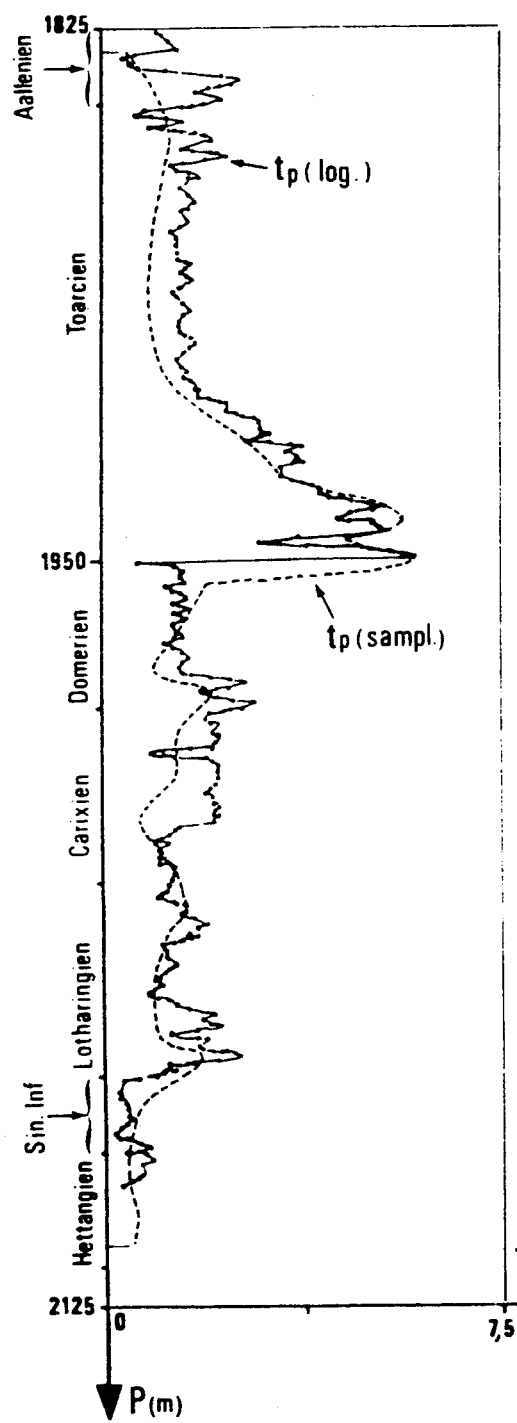
FIGS. 7 and 8 show two examples of graphs obtained experimentally which show the similarity of the organic matter contents obtained by the method of the invention and by a conventional method of geochemical type.
Figure 8:
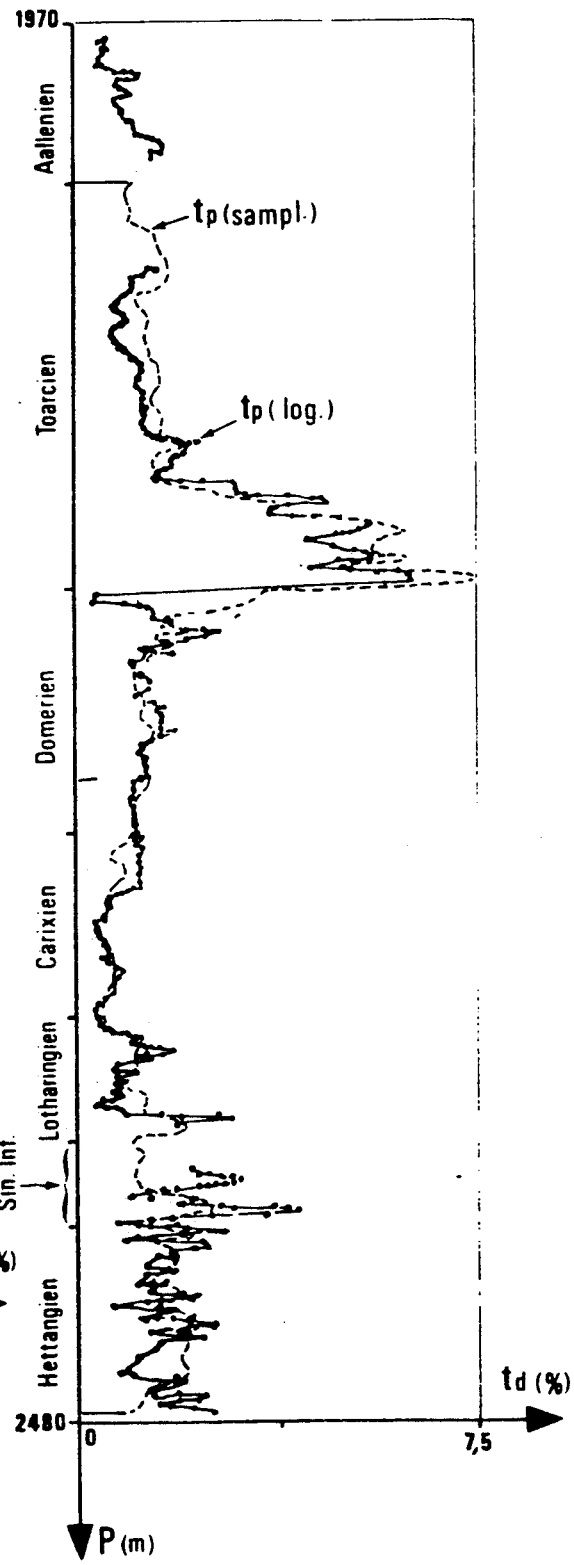

It has been verified experimentally that the results obtained by the method of the invention tallied well with those where very numerous samples from cuttings had been made, as shown by the examples in FIGS. 7 and 8. In these figures, the grey zones are defined by the curve tp(sampl.) obtained from analyzed ground samples. The other graph represents the variation of the weighting organic carbon content estimated from well-logging measurements (tp log).

The method of the invention has been described using a graphic representation. Still within the scope of the invention, however, the well-logging data may be used without reference to any representation, particularly by using processing means programmed for searching for the set of pairs of values which serves as reference, so as to determine all the sets of pairs of values corresponding to iso-organic matter contents and so as to determine with which set of pairs each of the pairs of measurements made in the wells studied may be associated. For this, known relations are used between the resistivity of a rock, on the one hand, and the volumes and resistivities of its different components, on the other, and also the relations between the transit time of sound in a rock, on the one hand, and the volumes and transit times associated also with its same components.

What is claimed is:

1. A method for estimating the organic matter of sedimentary rocks using well-logging data measured in a well across formations of a sedimentary basin, comprising:

using data provided by at least two well-logging probes measuring two different parameters, chosen so that:
 a) one of the probes produces measurement signals evolving in the same direction in response to a variation of the water, clay and organic matter content in said sedimentary rocks,
 b) the other probe produces measurement signals evolving in opposite directions to each other in response to a variation of the organic matter content, on the one hand, and the water or clay content, on the other, in the same sedimentary rocks, and
 c) the two probes being further chosen so that a part at least of the sets of pairs of values of the measured parameters corresponding to an equal organic matter content, associated respectively with sedimentary rocks comprising a given proportion of clay or water, are substantially identical selecting of at least one pair of values of the characteristic parameters of the pure organic matter, establishing a network of sets of pairs of values of the measured parameters, each of the sets of said network corresponding to an equal organic matter content, taking as reference a set of pairs of values corresponding to sedimentary rocks containing a given organic matter content, successive determination of the set of pairs of the network, corresponding to the same content, to which belongs each of the pairs of values of the two parameters measured by the probes chosen, at a plurality of measuring points at different depths in the same well, and recording of the volumetric organic matter content values associated respectively with said sets of pairs, so as to provide a substantially continuous representation of the volumetric organic matter content of the formations crossed by the well.

2. The method as claimed in claim 1, wherein the measurements made by at least two well probes are used, adapted for measuring the electric resistivity of the ground crossed, the transit time of sound through the same ground, their hydrogen atom content or their density.

3. The method as claimed in claim 2, wherein measurements are used made by a well probe measuring the electric resistivity of the ground and at least one other well probe measuring the transit time of sound through this same ground, a representation diagram is chosen as a function of the resistivity and of the transit time where said network of sets of pairs of values of the parameters measured, each associated with the same content, may be likened to a family of substantially parallel iso-content lines, the organic matter content associated with each pair of values of the resistivity and of the transit time measured in the well then being determined by identifying the iso-content line passing through the point representative of said pair in the chosen representation diagram.

4. The method as claimed in claim 2, wherein measurements are used made by a well probe measuring the electric resistivity of the ground, and at least one other probe measuring its density.

5. The method as claimed in claim 1, wherein the weighting organic matter contents are further determined associated respectively with the different values of the volumetric contents obtained.

6. The method as claimed in claim 1, wherein the reference set is determined by selecting, from all the pairs of values measured in the well, at least one particular pair of values for which a given organic matter content may be associated.

7. The method as claimed in claim 1, wherein each pair of values of the parameters measured in the well is represented in a diagram as a function of coordinates, one measuring the transit time of sound in the rock and the other the inverse of the square root of the resistivity, where the sets of pairs of values corresponding to an equal content are represented by a family of straight lines parallel to a reference straight line, to which a given organic matter content may be assigned, the position of the latter being determined by at least two representative points, one being associated with a rock which contains only the matrix and said given organic matter content, the other with a pair of values measured in the well with which this same organic matter content may be associated.

8. The method as claimed in claim 7, wherein the position of the iso-content straight lines is determined between a straight line corresponding to rock devoid of organic matter and a pole corresponding to the values taken by the two parameters in the case where the rock only contains organic matter.

9. The method as claimed in claim 1, wherein the pair of values characteristic of the pure organic matter is obtained by comparison with data obtained by analysis of samples from different positions along the well.

* * * * *